United States Patent
Jin et al.

(10) Patent No.: US 11,117,166 B2
(45) Date of Patent: Sep. 14, 2021

(54) ULTRASONIC TRANSDUCERS WITH PIEZOELECTRIC MATERIAL EMBEDDED IN BACKING

(71) Applicant: Halliburton Energy Services, Inc., Houston, TX (US)

(72) Inventors: Jing Jin, Singapore (SG); Yao Ge, Singapore (SG); Batakrishna Mandal, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 57 days.

(21) Appl. No.: 15/541,448

(22) PCT Filed: Apr. 20, 2016

(86) PCT No.: PCT/US2016/028475
§ 371 (c)(1),
(2) Date: Jul. 3, 2017

(87) PCT Pub. No.: WO2016/190993
PCT Pub. Date: Dec. 1, 2016

(65) Prior Publication Data
US 2018/0021815 A1    Jan. 25, 2018

Related U.S. Application Data

(60) Provisional application No. 62/165,755, filed on May 22, 2015.

(51) Int. Cl.
*B06B 1/06* (2006.01)
*G01V 1/40* (2006.01)
*G01V 1/22* (2006.01)

(52) U.S. Cl.
CPC .............. *B06B 1/0685* (2013.01); *G01V 1/40* (2013.01); *B06B 2201/40* (2013.01);
(Continued)

(58) Field of Classification Search
CPC .............. B06B 1/0685; B06B 2201/40; B06B 2201/73; G01V 1/40; G01V 1/22; G01V 2200/16
See application file for complete search history.

(56) References Cited

U.S. PATENT DOCUMENTS

| | | | |
|---|---|---|---|
| 3,989,965 A | 11/1976 | Smith | |
| 4,326,274 A * | 4/1982 | Hotta | B06B 1/0681 310/317 |

(Continued)

FOREIGN PATENT DOCUMENTS

| | | |
|---|---|---|
| DE | 916593 B | 8/1954 |
| EP | 2610432 A1 | 9/1976 |

(Continued)

OTHER PUBLICATIONS

International Search Report and Written Opinion of PCT Application No. PCT/US2016/028475 dated Jul. 28, 2016: pp. 1-16.

*Primary Examiner* — Krystine E Breier
(74) *Attorney, Agent, or Firm* — Chamberlain Hrdlicka

(57) ABSTRACT

A system and downhole tool comprising an ultrasonic transducer with a piezoelectric material embedded in a backing and a method of determining a parameter using the ultrasonic transducer. A self-noise of the transducer can be reduced by the piezoelectric material being at least partially embedded in the backing. The ultrasonic transducer can include an encapsulating material that encapsulates the backing.

19 Claims, 9 Drawing Sheets

(52) U.S. Cl.
CPC ............ *B06B 2201/73* (2013.01); *G01V 1/22* (2013.01); *G01V 2200/16* (2013.01)

(56) References Cited

U.S. PATENT DOCUMENTS

| | | | | |
|---|---|---|---|---|
| 4,509,153 | A * | 4/1985 | Weight | G10K 11/32 |
| | | | | 310/357 |
| 4,528,652 | A * | 7/1985 | Horner | G10K 11/165 |
| | | | | 310/327 |
| 4,779,244 | A * | 10/1988 | Horner | B06B 1/0685 |
| | | | | 181/151 |
| 5,676,213 | A * | 10/1997 | Auzerais | B08B 3/12 |
| | | | | 166/177.2 |
| 6,443,900 | B2 * | 9/2002 | Adachi | B06B 1/0611 |
| | | | | 600/458 |
| 6,466,513 | B1 | 10/2002 | Pabon et al. | |
| 6,643,221 | B1 * | 11/2003 | Hsu | G01V 1/523 |
| | | | | 367/162 |
| 6,821,253 | B2 * | 11/2004 | Wakabayashi | B06B 1/0622 |
| | | | | 310/336 |
| 7,360,448 | B2 * | 4/2008 | Maginnis | G01F 1/662 |
| | | | | 73/861.27 |
| 7,728,486 | B2 * | 6/2010 | Matsuo | G10K 9/122 |
| | | | | 310/322 |
| 8,896,183 | B2 * | 11/2014 | Matsuo | B06B 1/0685 |
| | | | | 310/322 |
| 9,061,128 | B2 * | 6/2015 | Hall | A61N 5/0616 |
| 9,095,879 | B2 * | 8/2015 | Jung | A61B 8/4494 |
| 9,402,599 | B2 * | 8/2016 | Okuda | B06B 1/067 |
| 9,503,830 | B2 * | 11/2016 | Reiche | G10K 9/122 |
| 9,567,846 | B2 * | 2/2017 | Leggett, III | E21B 47/107 |
| 9,618,386 | B2 * | 4/2017 | Akiyama | A61B 8/4209 |
| 9,812,635 | B2 * | 11/2017 | Jin | A61B 8/4483 |
| 9,867,596 | B2 * | 1/2018 | Kobayashi | A61B 8/445 |
| 9,883,848 | B2 * | 2/2018 | Specht | G01S 15/8913 |
| 10,416,330 | B2 * | 9/2019 | Steinsiek | G01V 1/40 |
| 2001/0031924 | A1 * | 10/2001 | Seward | A61B 8/4483 |
| | | | | 600/459 |
| 2004/0113524 | A1 | 6/2004 | Baumgartner | |
| 2004/0201331 | A1 | 10/2004 | Owen | |
| 2006/0058708 | A1 * | 3/2006 | Heart | A61H 23/0245 |
| | | | | 601/2 |
| 2007/0024432 | A1 * | 2/2007 | Oda | G01S 7/521 |
| | | | | 340/436 |
| 2009/0062656 | A1 * | 3/2009 | Hyuga | A61B 8/4488 |
| | | | | 600/459 |
| 2013/0160539 | A1 * | 6/2013 | Maki, Jr. | E21B 47/01 |
| | | | | 73/152.16 |
| 2013/0327139 | A1 | 12/2013 | Goodman et al. | |
| 2014/0373619 | A1 * | 12/2014 | Slay | G01N 3/32 |
| | | | | 73/152.58 |
| 2015/0009782 | A1 * | 1/2015 | Engl | G01N 29/221 |
| | | | | 367/189 |
| 2015/0198030 | A1 * | 7/2015 | Tello | E21B 47/005 |
| | | | | 367/86 |

FOREIGN PATENT DOCUMENTS

| | | |
|---|---|---|
| EP | 0766071 A1 | 4/1997 |
| WO | 8809150 A1 | 12/1988 |

* cited by examiner

ULTRASONIC TRANSDUCERS WITH PIEZOELECTRIC MATERIAL EMBEDDED IN BACKING

This section is intended to provide relevant contextual information to facilitate a better understanding of the various aspects of the described embodiments. Accordingly, it should be understood that these statements are to be read in this light and not as admissions of prior art.

Piezoelectric ultrasonic transducers use a piezoelectric material to convert between electrical and mechanical energies. Voltage applied to the piezoelectric material causes the piezoelectric material to oscillate at a particular frequency and produce a pressure wave. In medical, oilfield, or other industries, the pressure wave may be directed toward a target (or target area) and reflected from the target back toward the piezoelectric material. The piezoelectric material can convert the received reflected pressure wave into an electrical signal. For example, ultrasonic transducers may be capable of converting a pressure wave into an electric signal (mechanical to electrical) as a receiver and converting an applied voltage into a pressure wave at a particular frequency (electrical to mechanical) as a transmitter. Those having ordinary skill in the art would appreciate that transducers may also convert between other energy types including, electromagnetic, chemical, and thermal, among others. Data acquired using ultrasonic transducers may include electrical signals indicative of pressure waves or other types of energy and may be analyzed to determine certain properties of the target.

FIG. 1 shows a schematic view of a piezoelectric ultrasonic transducer 100. As shown, the ultrasonic transducer 100 includes a piezoelectric material 102, an epoxy 104, a backing 106, and an encapsulating material 108. The piezoelectric material 102 is bonded to a backing 106 using an epoxy 104.

In a pulse-echo application, the transducer 100 may transmit one or more ultrasound waves 110 in order to scan or detect one or more parameters of a target 112. The transducer 100 transmits the ultrasound wave 110 toward the target 112. Further, the target 112 reflects the ultrasound wave 110 as an echo 114 that may be received by the transducer 100. The backing 106 may be used as a damping material to lower the mechanical quality factor of the transducer 100 and may also be used to attenuate transmitted ultrasound waves 110 or the received echoes 114. In some cases, ring-down noise 116 propagating from the lower portion of the backing 106 back to the piezoelectric material 102 may be generated in the transducer 100 due to transmission of the ultrasound wave 110 and/or reception of the echo 114. The target 112 may be thick enough to generate a reflection 118 of the wave 110 propagating from the back of the target 112 to arrive at the transducer 100 after the ring-down noise 116 dissipates.

FIG. 2 shows a graph of a pulse-echo signal 201 produced by the transducer 100 in response to receiving the echo 114. As shown, the amplitude (V) of the signal 201 produced by the transducer 100 is graphed as a function of time (us). The transducer 100 produces the signal 201 in response to the echo 114 and is at least in part indicative of parameters of the echo 114 and/or the target 112. As shown in the graph, the signal 201 demonstrates that the echo 114 reflecting from the front surface of the target 112 is dominant in the portion 203 of the signal 201, while a tail echo 205, which can include the ring-down noise 116 generated within the transducer 100, follows the echo 114. In some cases, the ring-down noise 116 can be generated entirely in the transducer 100 after receiving the echo 114 without including interference from the reflection 118 traveling from the back of the target 112. In some applications, only the time of arrival and amplitude of the echo 114 are of interest. As shown in the graph, the time of arrival and amplitude may be obtained from the signal 201 where an arrival time 207 is about 145 microseconds and a peak amplitude 209 of the signal 207 is approximately 0.46V. These values of the signal 201 are at least in part indicative of the echo 114 traveling from the front surface of the target 112, but do not provide information about the one or more characteristics or parameters inside the target 112.

Parameters of the tail echo 205 may also be of interest. As used herein, the tail echo 205 refers to a portion of the signal 201 that can be indicative of a parameter of interest inside the target 112. The tail echo 205 is indicative of the sound waves that went through the target 112 and returned back to the transducer 100. For example, in some applications, estimation of impedance behind a borehole casing or imaging behind a highly reflective layer (for example, steel casing) in the target 112 may be of interest. In medical applications, tissue structures beyond the first layer may be of interest. As another example, in an oil and gas production well, the cement bonding behind the steel casing may be evaluated.

Accordingly, not only the arrival time 207 and amplitude 209 of the portion 203 of the signal 201 may be of interest, but also parameters of the tail echo 205 may be considered. As the amplitude of ring-down noise 116 generated in the transducer 100 (e.g., due to geometry and/or wave propagation within the transducer 200, among other reasons) approaches or exceeds the amplitude of the tail echo 205, reduction of transducer self-noise (i.e., noise caused by the transducer itself) may be beneficial for studying parameters of a signal produced by the transducer 200 after the arrival time of the peak amplitude 209 of the signal 201. Further, the transducer 100 may exhibit self-noise during transmission of ultrasound waves as well as during reception of ultrasound waves, in some cases, the self-noise in the tail echo 205 may be due to transducer construction. By altering transducer construction, the self-noise may be minimized.

BRIEF DESCRIPTION OF THE DRAWINGS

For a detailed description of the embodiments, reference will now be made to the accompanying drawings in which.

DETAILED DESCRIPTION

Figure 1:
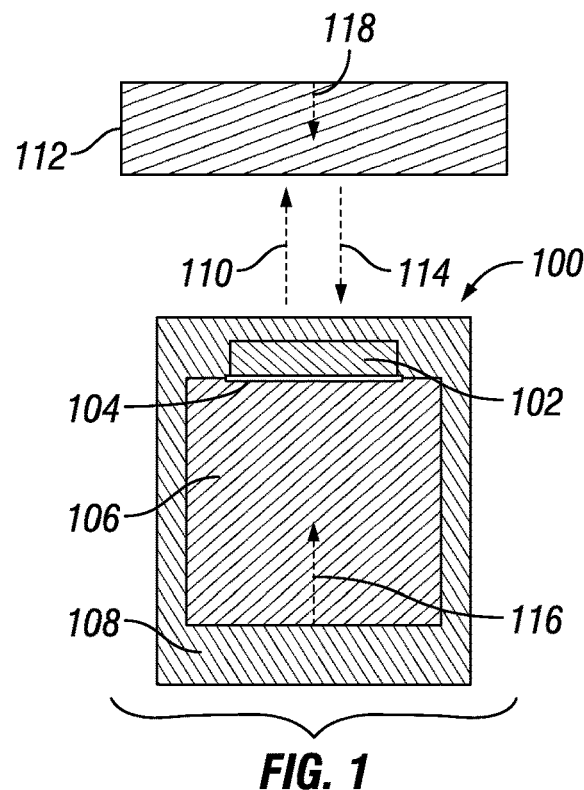
FIG. 1 shows schematic view of an ultrasonic transducer.
Figure 2:
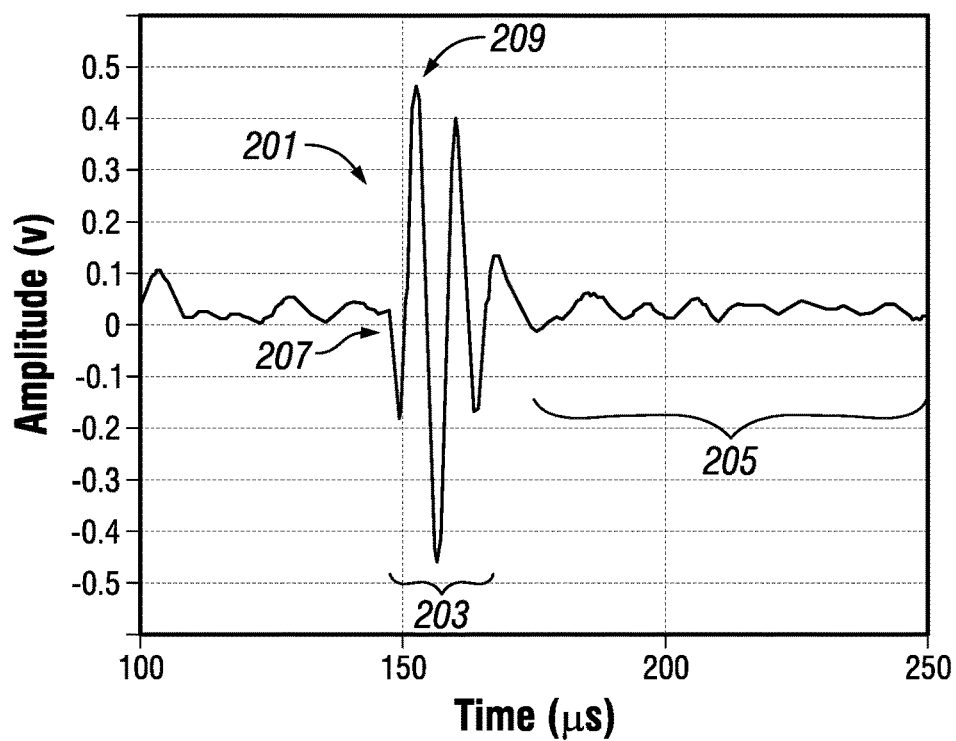
FIG. 2 shows a graph of a pulse-echo signal produced by the transducer of FIG. 1.
Figure 3A:
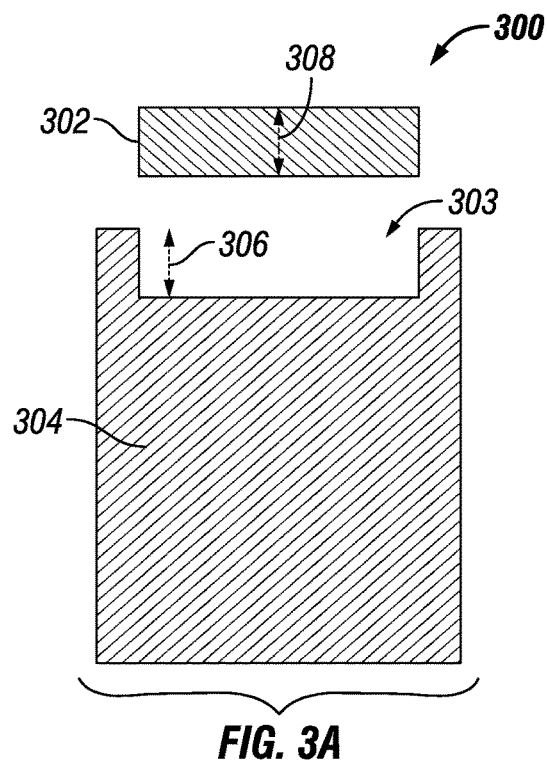
FIGS. 3A and B show a schematic view of a backing with a cavity in accordance with one or more embodiments.
Figure 3B:
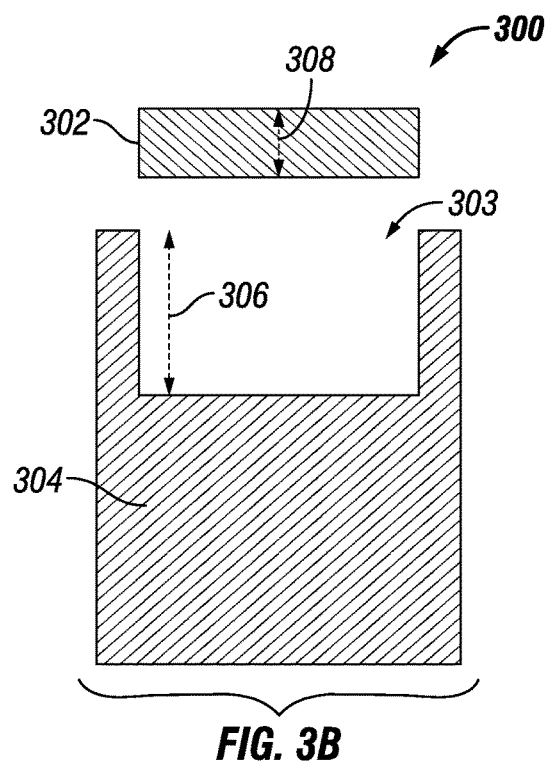

This disclosure provides a piezoelectric transducer with a reduced self-noise. Specifically, this disclosure provides an ultrasonic transducer with a piezoelectric material embedded in a cavity of a backing that reduces the self-noise to improve the analysis or imaging of a tail echo.

FIGS. 3-6 show schematic views of a transducer 300 in accordance with one or more embodiments. As shown in FIG. 3A, a piezoelectric material 302 is embedded within a backing 304. The piezoelectric material 302 can include a piezoelectric crystal and/or a piezoelectric ceramic (e.g., lead zirconate titanate). The backing 304 can be any suitable material with an impedance that dampens at least a portion of the self-noise and/or ring-down noise generated by the piezoelectric material 304. The backing 304 may be adapted to adjust the bandwidth of the piezoelectric material 304. The backing 304 can include a material with an impedance substantially similar (e.g., within 5%) of the impedance of the piezoelectric material 302. Additionally, or alternatively, the backing 304 can include a tungsten rubber material, which is tungsten (such as a tungsten powder) mixed in a rubber matrix. Due to the density of tungsten, the tungsten rubber material can absorb some of the sound waves attributable to self-noise as well as increase the transmission and reception energy of the piezoelectric material 302. In one or more embodiments, one-third to all of the height 308 of the piezoelectric material 302 can be located in a cavity 303 (or step) of the backing 304. In one or more embodiments, the depth 306 of the cavity 303 is at least one-third to all of the height 308 of the piezoelectric material 302 or greater. In certain embodiments, the depth 306 of the cavity 303 is at least 33%, 50%, 75%, 100%, or greater than 100% of the height 308 of the piezoelectric material 302. As shown in FIG. 3B, the cavity 303 may have a depth 306 greater than the height 308 with enough backing 304 behind the piezoelectric material 302 to absorb sound waves attributable to self-noise.

Figure 4:
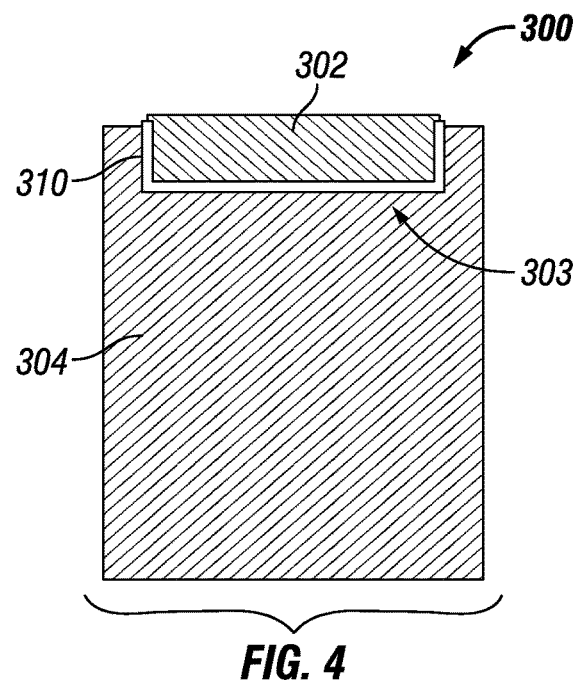
FIG. 4 shows a schematic view of a piezoelectric material embedded within a backing in accordance with one or more embodiments.

As shown in FIG. 4, the cavity 303 may include a bonding material or agent 310 disposed within the cavity 303 and between at least a part of the cavity 303 and at least a part of the piezoelectric material 302. For example, the bonding material or agent 310 may include an epoxy or adhesive suitable for the ultrasound applications of the piezoelectric material 302. For medical applications, where the transducer 300 is used at room temperature, some commercial epoxies or adhesives with bonding layer thickness less than 0.05 inches may be used as the bonding material 310 for securing the piezoelectric material 302 to the backing 304. In a borehole or other oil and gas well applications, where high temperature (greater than 200° F. or 93° C.) may occur, epoxies rated for the corresponding temperature may be used as the bonding material 310. In general, the electrical property of the bonding material 310 is non-conductive, but in some cases, the bonding material 310 may be conductive.

Figure 5:
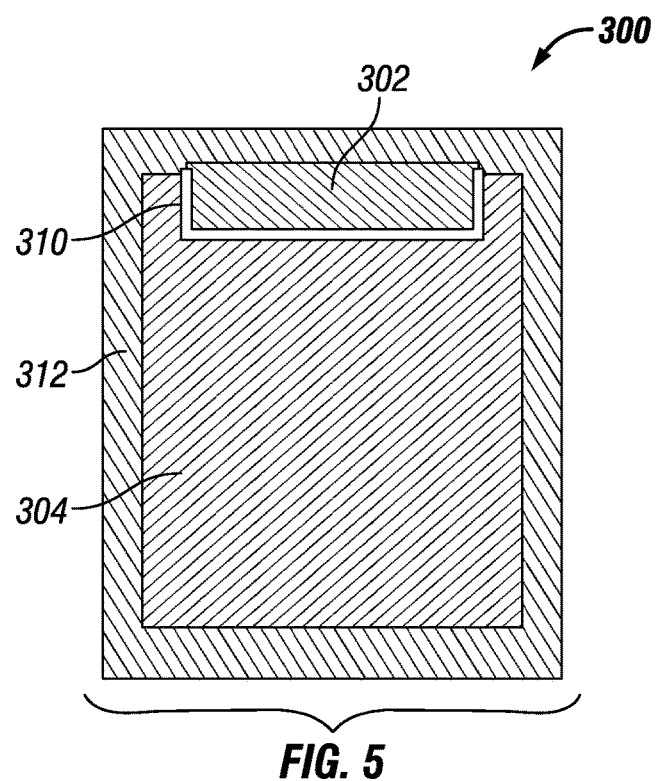
FIG. 5 shows a schematic view of a transducer in accordance with one or more embodiments.

As a non-limiting example, the bonding material 310 may include DURALCO® 4703, a high temperature epoxy available from COTRONICS™ Corporation of Brooklyn, N.Y. The piezoelectric material 302 and backing 304 may also be encapsulated by an encapsulating material 312, as shown in FIG. 5. In one or more embodiments, the encapsulating material 312 can include an insulating casting compound and/or epoxy, such as INSULCAST® 125 available from ITWS Engineered Polymers North America of Montgomeryville, Pa. The encapsulating material 312 can be molded around the piezoelectric material 302 and backing 304.

Figure 6:
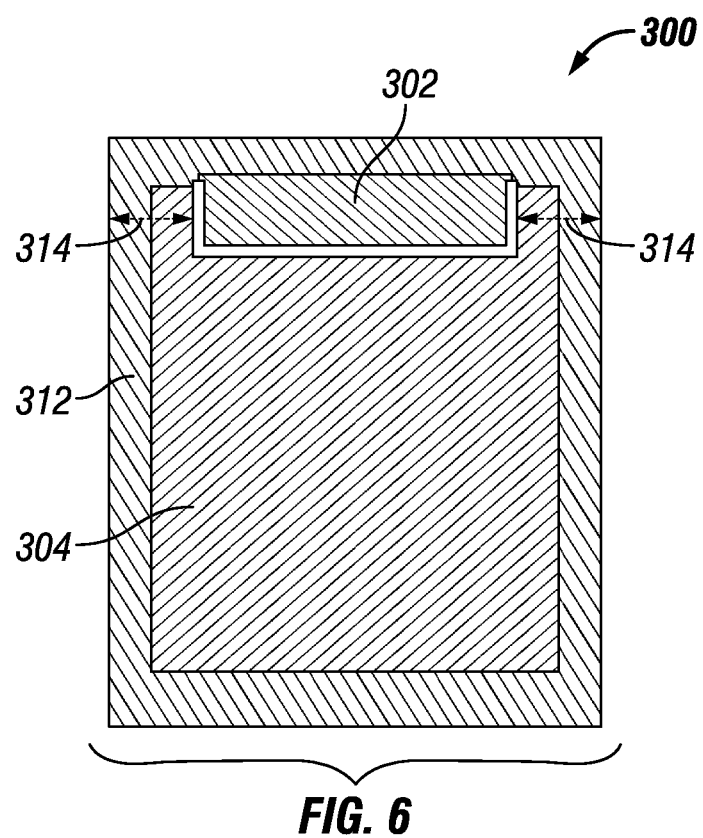
FIG. 6 shows a schematic view of a transducer in accordance with one or more embodiments.

In one or more embodiments, embedding the piezoelectric material 302 into the backing 304 can reduce the mechanical quality factor of the transducer 300. Therefore, the self-noise of the transducer 300 may be reduced and/or the bandwidth of the transducer 300 in the frequency domain may increase. In addition, as shown in FIG. 6, ultrasonic reflections 314 propagating between the side of piezoelectric material 302 and the encapsulating material 312 may be attenuated by the backing 304 between the side of the piezoelectric material 302 and the encapsulating material 312. Thus, the backing 304 may be configured to attenuate ultrasound waves propagating between the piezoelectric material 302 and the encapsulating material 312. Further, the increased bonding area between the piezoelectric material 302 and the backing 304 may improve the overall robustness of the bonding material 310 at high temperature (e.g., at least about 200° F. or 93° C.) and/or high pressure (e.g., at least about 15,000 psi or 103 MPa). such as in a borehole or other oil and gas well applications.

Figure 7:
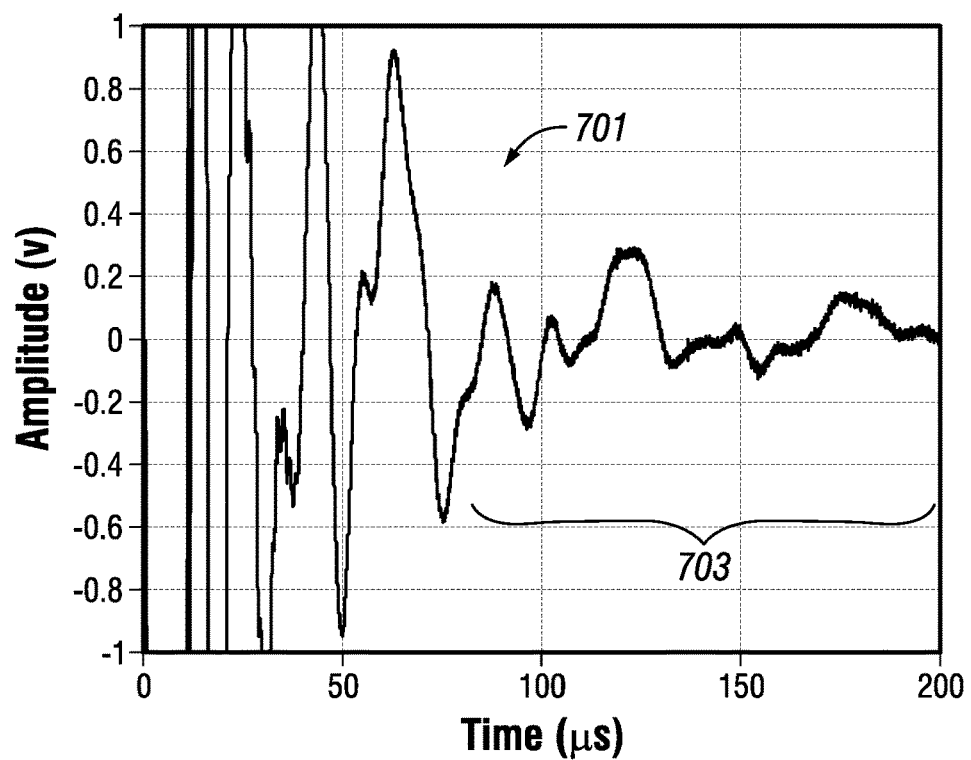
FIG. 7 shows a graph of a self-noise plot of a signal produced by an exam transducer in accordance with one or more embodiments.
Figure 8:
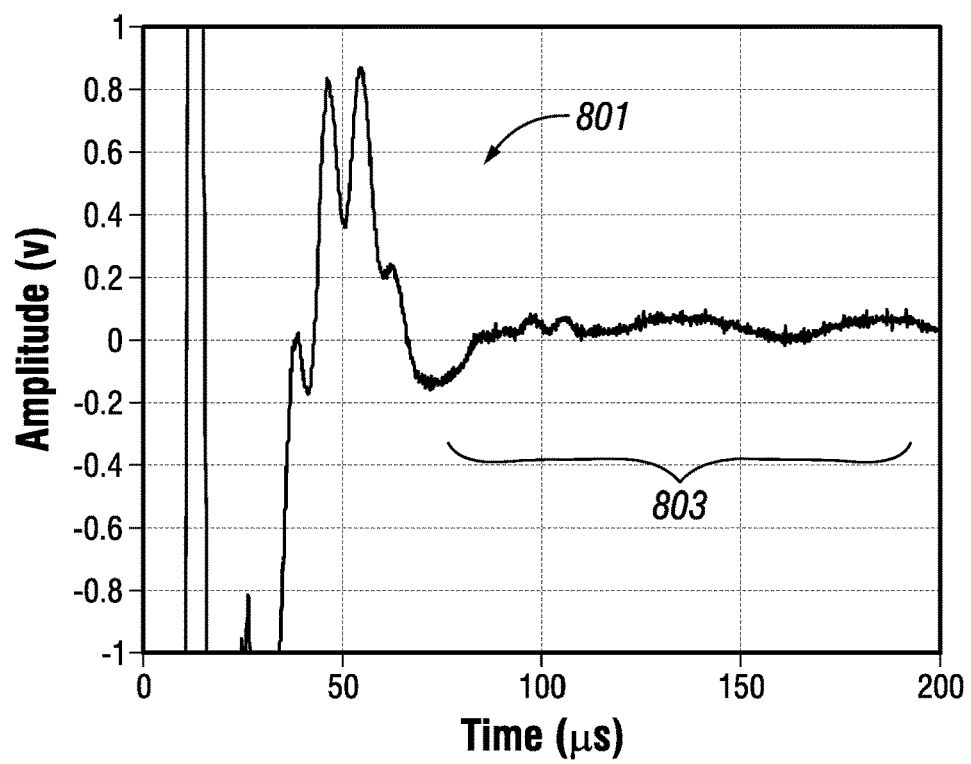
FIG. 8 shows a graph of a self-noise plot of a signal produced by an example transducer in accordance with one or more embodiments.

Referring now to FIGS. 7-9, graphs of pulse-echo signal plots of two transducers 100 and 300, each comprising the same piezoelectric material and backing material, are shown for comparison, in accordance with one or more embodiments. To obtain the plots in FIGS. 7 and 8, each transducer 100 and 300 was immersed in water and excited by a 100V, 5 microsecond square wave pulse. Further, each transducer 100 and 300 was not placed near a target or interface to produce a reflection or echo. Thus, the plots in FIGS. 7 and 8 represent any self-noise and/or ring-down noise propagating in the transducers 100 and 300. In FIG. 7, a signal 701 is shown produced by the transducer 100 including a piezoelectric material bonded to a top surface of a backing material in FIG. 8, a signal 801 is shown produced by the transducer 300, in accordance with one or more embodiments, including a piezoelectric material embedded in a backing material, as shown in FIGS. 3-6. As shown in FIG. 7, the self-noise 703 after about 80 microseconds is apparent, whereas, under similar test conditions, the transducer 300 with the piezoelectric material 302 embedded in the backing material 304 produced much less self-noise 803, especially after 80 microseconds.

Figure 9A:
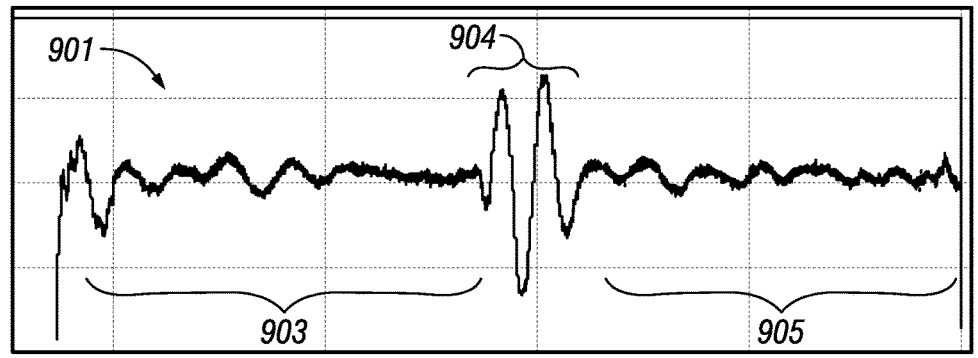
FIG. 9A shows a graph of a signal produced by an example transducer in accordance with one or more embodiments.
Figure 9B:
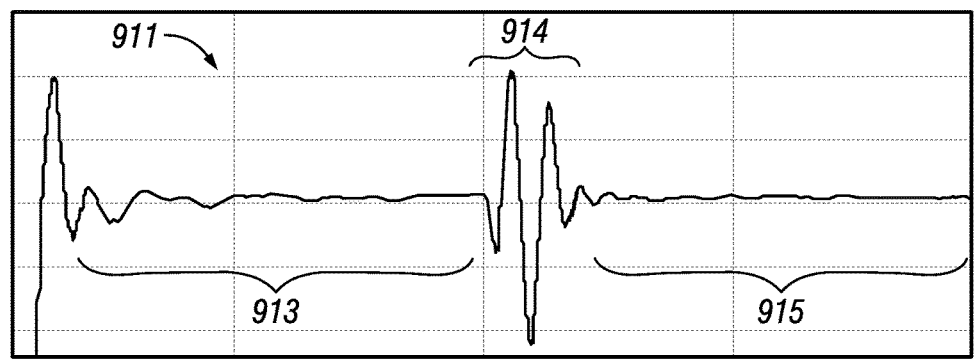
FIG. 9B shows a graph of a signal produced by an example transducer in accordance with one or more embodiments of the present disclosure.

FIGS. 9A-9B show graphs of pulse-echo signal plots produced by transducers 100 and 300 immersed in water at a distance of about 3 inches (7.62 cm) from a reflection interface including a steel block having the dimensions of about 6×6×6 inches (15.24×15.24×15.24 cm), according to one or more embodiments. In FIG. 9A, the signal 901 is produced by the transducer 100, while in FIG. 9B the signal 911 is produced by the transducer 300. The signal portions 904 and 914 are indicative of the reflections received from the reflecting interface by the respective transducers 100 and 300. The transmission noise 903 and receiving noise 905 is much more apparent in the top-bonded design of transducer 100 as shown in FIG. 9A, when compared to the transmission noise 913 and the receiving noise 915 produced by the embedded design of the transducer 300, as shown in FIG. 9B.

Figure 10:
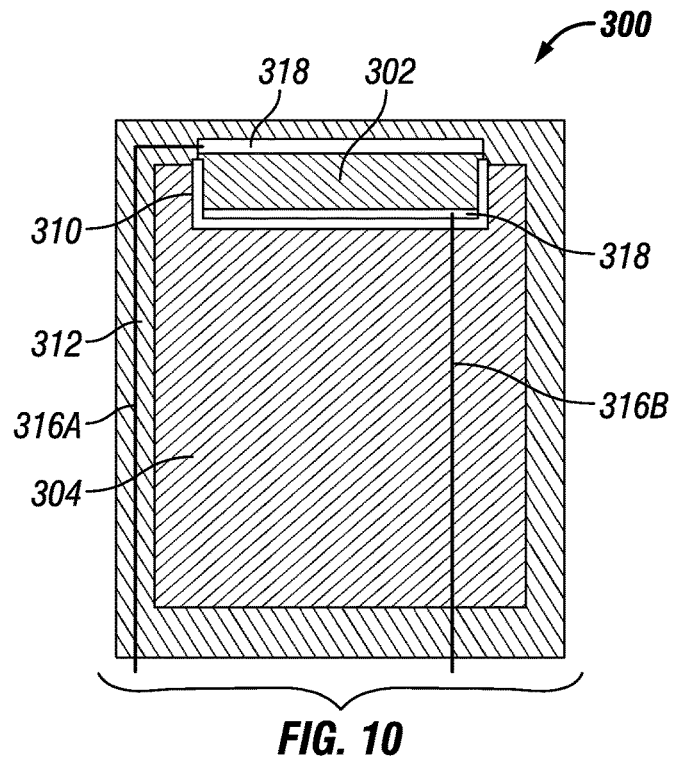
FIG. 10 shows a schematic view of a wire connection to a transducer in accordance with one or more embodiments.
Figure 11:
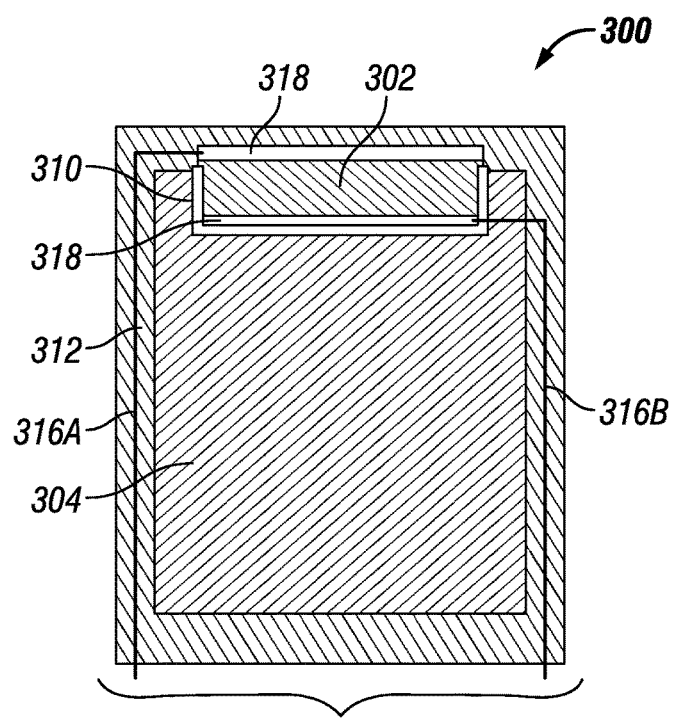
FIG. 11 shows a schematic view of a wire connection to a transducer in accordance with one or more embodiments.

FIGS. 10 and 11 depict schematic views of the wiring of the piezoelectric material 302 within the backing 304 of the transducer 300, in accordance with one or more embodiments. In FIG. 10, wires 316A, B may be connected to electrodes 318 that electrically engage the piezoelectric material 302. The wire 316B may run through the backing 304 away from the piezoelectric material 302. The wires 316 can serve as electrical connections to the electrodes 318 to energize or excite the piezoelectric material 302. In FIG. 11, the wire 316B may be electrically connected to the piezoelectric material 302 via electrode 318 by running the wire 316B through a side of the backing 304 and into the encapsulating material 308. The wires 316A, B may be directed out of the encapsulating material 308 and away from the piezoelectric material. In one or more embodiments, if the backing 304 includes a conductive material, the wires 316A, B can connect directly to the backing 304.

Figure 12:
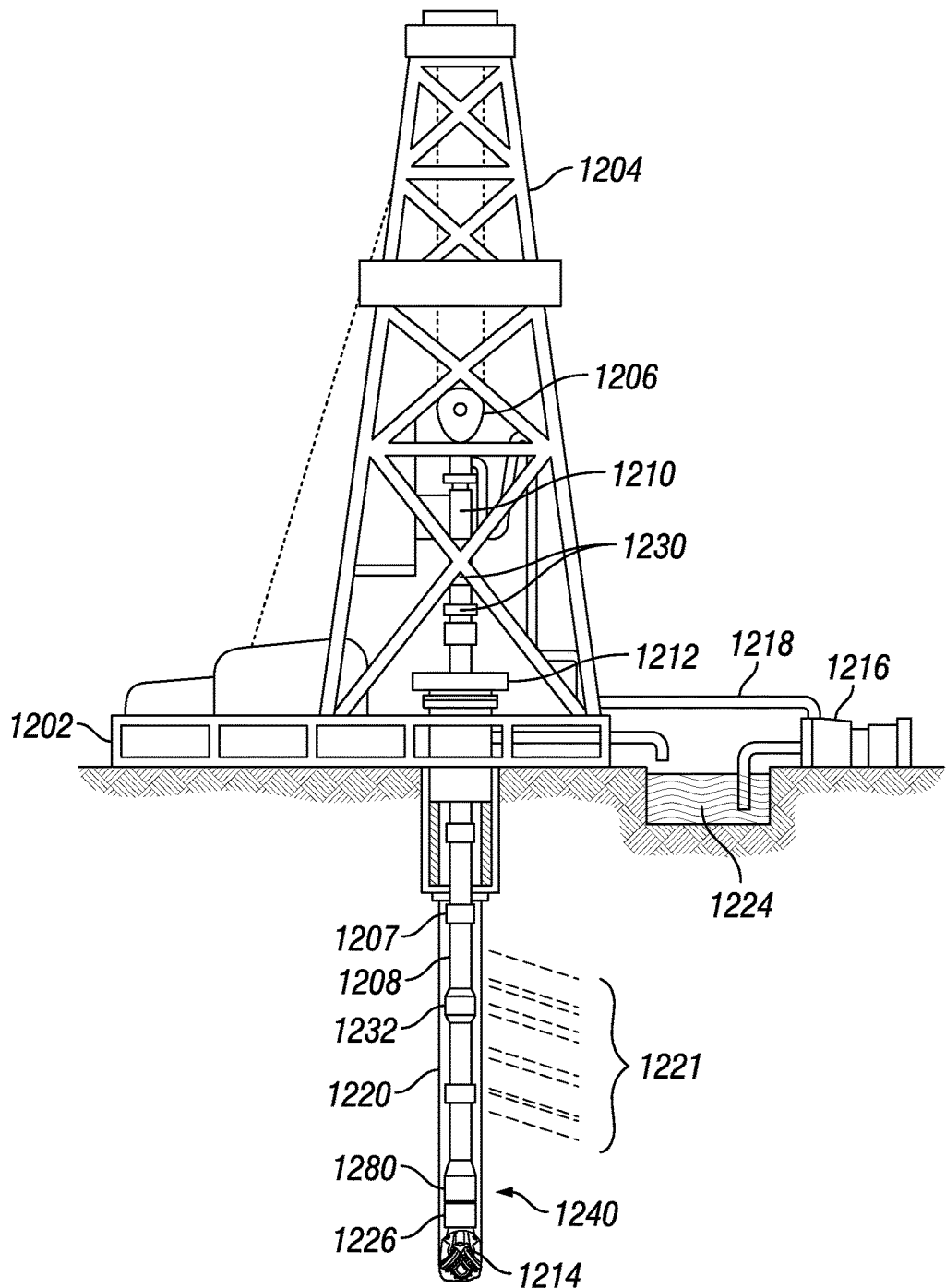
FIG. 12 shows schematic view of drilling environment in accordance with one or more embodiments and FIG. 13 shows a schematic view of a wireline logging environment in accordance with one or more embodiments.

FIG. 12 shows a schematic view of a logging-while-drilling (LWD) and/or measuring-while-drilling (MWD) environment in which a transducer 1226 in accordance with one or more embodiments described in the present disclosure may be used. As shown, a drilling platform 1202 is equipped with a derrick 1204 that supports a hoist 1206 for raising and lowering a drill string 1208. The hoist 1206 suspends a top drive 1210 that rotates the drill string 1208 as the drill string is lowered through the wellhead 1212. Sections of the drill string 1208 are connected by threaded connectors 1207. Connected to the lower end of the drill string 1208 is a drill bit 1214. As the bit 1214 rotates, a borehole 1220 is created that intersects various subterranean earth formations 1221 within a reservoir. A pump 1216 circulates drilling fluid through a supply pipe 1218 to the top drive 1210, through the interior of the drill string 1208, through orifices in the drill bit 1214, back to the surface via the annulus around the drill string 1208, and into a retention pit 1224. The drilling fluid transports cuttings from the borehole into the pit 1224 and aids in maintaining the integrity of the borehole 1220.

A downhole tool 1240, e.g., an LWD/MWD tool, is located on the drill string 1208 and may be near the drill bit 1214. The downhole tool 1240 includes the transducer 1226 and the telemetry module 1280. The transducer 1226 is in communication with the telemetry module 1280 having a transmitter (e.g., acoustic telemetry transmitter) that transmits signals in the form of acoustic vibrations in the tubing wall of the drill string 1208. A receiver array 1230 may be coupled to tubing below the top drive 1210 to receive transmitted signals. One or more repeater modules 1232 may be optionally provided along the drill string to receive and retransmit the telemetry signals. Of course other telemetry techniques can be employed including mud pulse telemetry, electromagnetic telemetry, and wired drill pipe telemetry. Many telemetry techniques also offer the ability to transfer commands from the surface to the downhole tool 1240, thereby enabling adjustment of the configuration and operating parameters of the downhole tool 1240. In some embodiments, the telemetry module 1280 also or alternatively stores measurements for later retrieval when the downhole tool 1240 returns to the surface.

As the bit 1214 extends the borehole through the formations, the transducer 1226 may transmit an ultrasound wave radially outward from the downhole tool 1240 and receive echoes returning back from drilling fluid, casing, or cement bonding in the borehole 1220, for example. The transducer 1226 may produce signals indicative of a downhole parameter (e.g., by transmitting and receiving ultrasound waves in a pulse-echo application as described herein with respect to the transducer 300) in response to receiving ultrasound waves. The downhole parameter may include the orientation and/or position of the downhole tool 1240; borehole size; drilling fluid velocity and density; an acoustic velocity and impedance of at least one of the casing, drilling fluid, cement bonding, and/or the earth formation; and various other drilling conditions downhole. The signal produced by the transducer 1226 may be used to estimate an acoustic impedance behind a borehole casing or produce an image of any other highly reflective layer behind the borehole casing. As used herein, a highly reflective layer can include any layer of material having a different acoustic impedance than the drilling fluid. In some embodiments, the cement bonding behind the steel casing may also be evaluated based on the signals produced by the transducer 1226.

Figure 13:
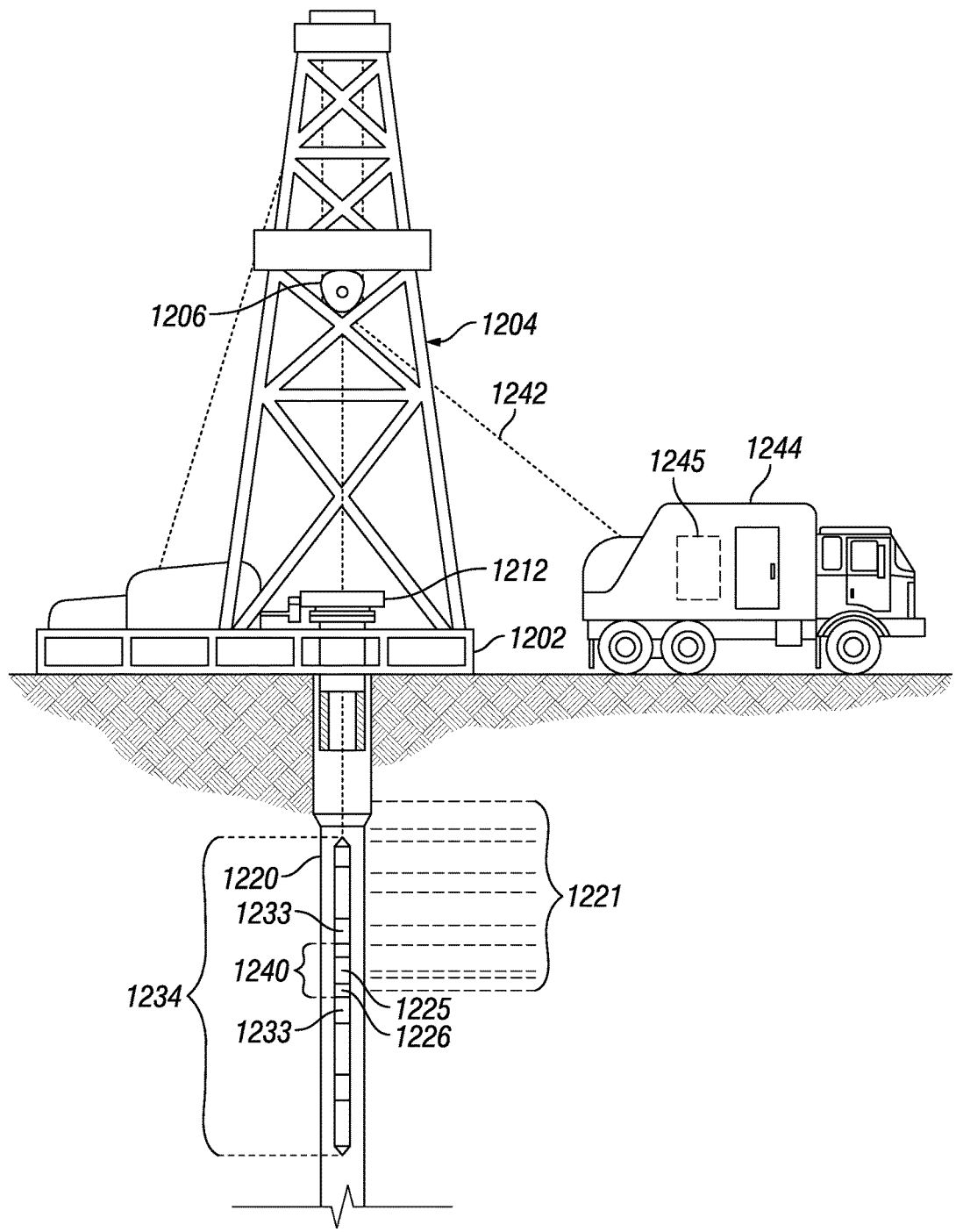

FIG. 13 shows a schematic view of a wireline logging environment in which the transducer 1226 in accordance with one or more embodiments described in the present disclosure may be used. As shown, logging operations can be conducted using a wireline logging string 1234, e.g., a wireline logging sonde, suspended by a cable 1242 that communicates power to the logging string 1234 and telemetry signals between the logging string 1234 and the surface. The logging string 1234 includes the downhole tool 1240, which may collect ultrasound logging data with the transducer 1226 as described herein. For example, the transducer 1226 may transmit an ultrasound wave radially outward from the downhole tool 1240 and receive echoes returning back from drilling fluid, casing, or cement bonding in the borehole 1220. The transducer 1226 may produce signals indicative of a downhole parameter related to the drilling fluid, casing, or cement bonding, such as an acoustic velocity and/or impedance. The downhole tool 1240 may include a rotator 1225 for rotating the transducer 1226 relative to the logging string 1234 and/or the downhole tool 1240 to collect the ultrasound signals in an azimuthal orientation in the borehole 1220. In one or more embodiments, the logging string 1234 may rotate relative to the borehole 1220 to rotate the transducer 1226 for collecting ultrasound signals in an azimuthal orientation. Additionally, or alternatively, the transducer 1226 and the downhole tool 1240 may be positioned on a distal end of the logging string 1234.

The downhole tool 1240 may be coupled to other modules of the wireline logging string 1234 by one or more adaptors 1233. A logging facility 1244 collects measurements from the logging string 1234, and includes a computer system 1245 for processing and storing the measurements gathered by the sensors. Among other things, the computer system 1245 may include a non-transitory computer-readable medium (e.g., a hard-disk drive and/or memory) capable of executing instructions to perform such tasks. In addition to collecting and processing measurements, the computer system 1245 may be capable of controlling the logging* string 1234 and downhole tool 1240. The logging facility 1244 may further include a user interface (not shown) which displays the measurements, for example, a monitor or printer. Thus, it should be appreciated that the transducer 1226 may be used in various downhole applications, such as wireline, slickline, coiled tubing, MWD, or LWD applications.

In an ultrasonic scanning system, high signal to noise ratio (SNR) may be of particular interest. The SNR, is usually improved by optimizing electronics in the system, to lower the electronics noise to the level of transducer self-noise. In some situations, the self-noise of the transducer becomes the bottleneck of the technology. Therefore, embodiments allow for an effective method and system to reduce the self-noise of an ultrasonic piezoelectric transducer. Additionally, one or more embodiments of this disclosure provide for an alternative way to construct a transducer by using the same materials, in the same form factor, while reducing the self-noise of the transducer. Further, in one or more embodiments, one or more matching piezoelectric materials may be bonded using the bonding material as described herein to a top surface of the piezoelectric material embedded in the bonding material.

In addition to the embodiments described above, many examples of specific combinations are within the scope of the disclosure, some of which are detailed below:

EXAMPLE 1

A system comprising:
an ultrasonic transducer comprising:
a backing; and
a piezoelectric material at least partially embedded in the backing.

EXAMPLE 2

The system of example 1, further comprising an encapsulating material, wherein the piezoelectric material and the backing is encapsulated within the encapsulating material.

EXAMPLE 3

The system of example 1, further comprising a bonding material between the piezoelectric material and the backing.

EXAMPLE 4

The system of example 3, wherein the bonding material comprises an epoxy.

EXAMPLE 5

The system of example 3, wherein the bonding material comprises a thickness less than 0.05 inches.

EXAMPLE 6

The system of example 3, wherein the bonding material is configured to be subjected to a temperature greater than 200° F. (93° C.).

EXAMPLE 7

The system of example 1, wherein the backing comprises a cavity and the piezoelectric material is located in the cavity.

EXAMPLE 8

The system of example 7, wherein at least one-third to all of the height of the piezoelectric material is located in the cavity.

EXAMPLE 9

The system of example 1, further comprising a downhole tool including the transducer.

EXAMPLE 10

The system of example 2, wherein the backing material is configured to attenuate sound waves propagating between the piezoelectric material and the encapsulating material.

EXAMPLE 11

A downhole tool locatable in a borehole intersecting a subterranean earth formation, comprising:
an ultrasonic transducer comprising:
a backing; and
a piezoelectric material at least partially embedded in the backing.

EXAMPLE 12

The downhole tool of example 11, further comprising an encapsulating material, wherein the piezoelectric material and the backing is encapsulated within the encapsulating material.

EXAMPLE 13

The downhole tool of example 11, further comprising a bonding material between the piezoelectric material and the backing.

EXAMPLE 14

The downhole tool of example 11, wherein the backing comprises a cavity, and the piezoelectric material is located in the cavity.

EXAMPLE 15

The downhole tool of example 14, wherein at least one-third to all of the height of the piezoelectric material is located in the cavity.

EXAMPLE 16

The downhole tool of example 11, wherein the bonding material is configured to be subjected to a temperature greater than 200° F. (93° C.).

EXAMPLE 17

The downhole tool of example 12, wherein the backing material is configured to attenuate sound waves propagating between the piezoelectric material and the encapsulating material.

EXAMPLE 18

A method of determining a parameter using an ultrasonic transducer, comprising:
embedding a piezoelectric material at least partially in a backing;
producing a signal in response to receiving an ultrasound wave with the piezoelectric material, a self-noise of the transducer being reduced by the piezoelectric material being at least partially embedded in the backing; and determining the parameter using the signal.

EXAMPLE 19

The method of example 18, wherein embedding the piezoelectric material further comprises embedding the piezoelectric material in a cavity of the backing.

EXAMPLE 20

The method of example 18, wherein embedding the piezoelectric material further comprises embedding from one-third to all of the height of the piezoelectric material in the backing.

EXAMPLE 21

The method of example 18, wherein determining the parameter comprises determining an acoustic impedance in a borehole intersecting a subterranean earth formation.

This discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness: Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A system comprising:
an ultrasonic transducer operable to transmit and receive pressure waves, the ultrasonic transducer comprising:
a backing;
a piezoelectric material at least partially embedded in and filling a cavity in the backing;
a bonding material disposed between the piezoelectric material and the backing; and
wherein the piezoelectric material is only partially embedded in the backing such that at least two surfaces of the piezoelectric material are at least partially not in contact with the backing.

2. The system of claim 1, further comprising an encapsulating material molded around the piezoelectric material and the backing, wherein the piezoelectric material and the backing are fully encapsulated within the encapsulating material.

3. The system of claim 1, wherein the bonding material comprises an epoxy.

4. The system of claim 1, wherein the bonding material comprises a thickness less than 0.05 inches.

5. The system of claim 1, wherein the bonding material is configured to be subjected to a temperature greater than 200° F. (93° C.).

6. The system of claim 1, wherein at least one-third to all of the height of the piezoelectric material is located in the cavity.

7. The system of claim 1, further comprising a downhole tool including the transducer.

8. The system of claim 2, wherein the backing is configured to attenuate sound waves propagating between the piezoelectric material and the encapsulating material.

9. A downhole tool locatable in a borehole intersecting a subterranean earth formation, comprising:
an ultrasonic transducer operable to transmit and receive pressure waves, the ultrasonic transducer comprising:
a backing;
a piezoelectric material at least partially embedded in and filling a cavity in the backing;
a bonding material disposed between the piezoelectric material and the backing; and
wherein the piezoelectric material is only partially embedded in the backing such that at least two surfaces of the piezoelectric material are at least partially not in contact with the backing.

10. The downhole tool of claim 9, wherein at least one-third to all of the height of the piezoelectric material is located in the cavity.

11. The downhole tool of claim 9, wherein the bonding material is configured to be subjected to a temperature greater than 200° F. (93° C.).

12. The downhole tool of claim 9, wherein the backing is configured to attenuate sound waves propagating between the piezoelectric material and the encapsulating material.

13. A method of determining a parameter using an ultrasonic transducer, comprising:
embedding a piezoelectric material only partially in a cavity of a backing such that at least two surfaces of the piezoelectric material are at least partially not in contact with the backing and bonding the piezoelectric material with the backing with a bonding material, wherein the backing has an impedance that is substantially similar to the impedance of the piezoelectric material;

receiving an ultrasound wave via the ultrasonic transducer;

producing a signal in response to receiving an ultrasound wave with the piezoelectric material, a self-noise of the transducer being reduced by the piezoelectric material being at least partially embedded in the cavity of the backing; and determining the parameter using the signal.

14. The method of claim 13, wherein embedding the piezoelectric material further comprises embedding from one-third to all of the height of the piezoelectric material in the backing.

15. The method of claim 13, wherein determining the parameter comprises determining an acoustic impedance in a borehole intersecting a subterranean earth formation.

16. The system of claim 1, wherein the backing comprises a tungsten rubber material.

17. The downhole tool of claim 9, wherein the backing comprises a tungsten rubber material.

18. The method of claim 13, wherein the backing comprises a tungsten rubber material.

19. The system of claim 1, wherein the bonding material is non-conductive.

* * * * *